Sept. 2, 1952  C. W. VOGT  2,609,317
SEALING OF THERMOPLASTIC MATERIALS
Filed Oct. 7, 1948
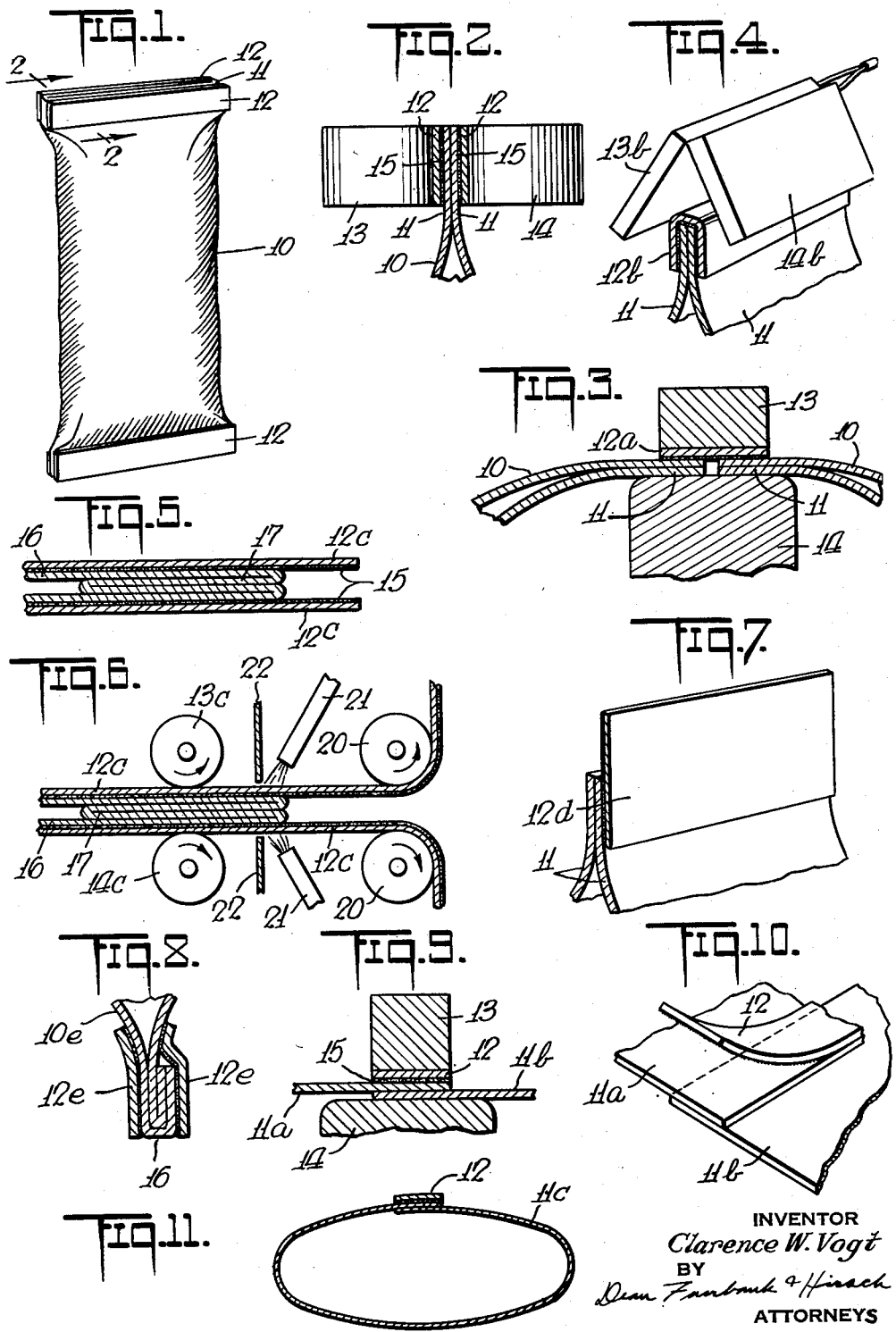
INVENTOR
Clarence W. Vogt
BY
Dean Fairbank & Hirsch
ATTORNEYS Patented Sept. 2, 1952

2,609,317

UNITED STATES PATENT OFFICE 2,609,317

SEALING OF THERMOPLASTIC MATERIALS

Clarence W. Vogt, Norwalk, Conn.

Application October 7, 1948, Serial No. 53,333

1 Claim. (Cl. 154—43)

This invention relates to the sealing together of superposed or overlapped sheets or layers of thermoplastic sheet material by the use of heat, which softens or renders plastic the contacting surfaces of the overlapped portions and effects an autogenous welding. It relates more particularly to those types of synthetic sheet material which shrink or melt when subjected to a temperature sufficiently high to effect the direct uniting of contacting parts.

Many types of synthetic sheet material which are suitable for forming bags or wrappers exhibit characteristics which have made the welding or direct autogenous union of superposed portions practically impossible under the usual operating conditions, and have made it necessary to use an intermediate connecting layer of glue or other adhesive of quite different composition from that of the sheet to be connected.

One of the characteristics referred to is objectionable wrinkling or shrinking, and even melting and flowing, at a temperature very close to that at which there is sufficient softening or tackiness to effect an autogenous weld of superposed layers. Thus, prior to the present invention it has not been found practical to form or seal bags of such material, or to connect together two or more sheets at overlapped edges, or connect together the opposite edges of a sheet, without the use of an adhesive of different composition or the use of an electronic sealer having belts through which pressure is applied and maintained until the sheets have cooled below the sealing range.

Among the types of such synthetic sheets are polyvinylidene films or sheets, such as sold by Dow Chemical Co. under the trade name of "Saran," tensilized Pliofilm sheets sold by Goodyear Tire & Rubber Co., oriented polyethylene sheets made from resins produced by Union Carbide and Carbon Corp., and a modified form of polyvinylidene tubes or sheets sold by Dewey Almy Chemical Co. under the trade name of "Cryowrap."

The orientation of polyethylene is accomplished by stretching, and this is also true, in a measure, of Cryowrap, Pliofilm and Saran. If an attempt be made to later heat overlapping portions of such films to a temperature at which the autogenous welding can be effected, they tend to shrink in width while in the sealer and form highly objectionable wrinkles which interfere with or prevent the forming of a tight seal. The film may even melt if the directly applied heat be too great.

These and other analogous materials will be referred to hereinafter as heat-shrinkable and heat-sealable sheet material.

I have discovered an arrangement of parts and a method whereby superposed layers or overlapped edges of such materials may be autogenously welded together to form a seam, and without the objectionable shrinkage above referred to. Thus it is possible to make large sheets by welding together the overlapped edges of smaller ones; to make tubes by overlapping and welding together opposite edges of a sheet; to seal one end of a tube and thereby make a bag; to close and seal the mouth or open end of a bag after filling, and perform various other desirable operations.

In carrying out my invention I employ a non-shrinkable and preferably non-meltable sheet material which is adhesively secured to at least one of the outer superposed layers which are to be autogenously welded, and covering the area where the weld is to be effected. Pressure and sufficient heat are applied to effect the autogenous welding together of said layers in the area in which the heat and pressure are applied. The adhesive is preferably one which has a high shear at the welding temperature of the layers, so that under the pressure applied, it holds said layers against shrinking during the welding. As it is ordinarily desirable to weld together only edge portions of said layers, the non-meltable outer sheet may be in the form of a strip or tape only a little wider than the area to be sealed. Therefore this outer or shrink-preventing sheet will hereinafter be referred to as a tape or strip, although the width and length of it will vary in accordance with the dimensions of the area to be sealed.

During the heating to effect the softening or rendering tacky of said layers in the seal area, one of the layers is held firmly to the strip, and due to the combined actions of the strip, the adhesive thereon, and the pressure, the shrinking tendency of such layers is rendered ineffective. The heat may be applied only momentarily, and upon the removal of the heating element the rapid radiation of the heat permits the almost instantaneous cooling of the layers below the welding temperature, and the relative stiffness of the strip and the high shear adhesive holding the strip in place prevents any appreciable shrinking of the sheets in the area where they are welded together. Thus the layers may be autogenously welded to form a flat smooth seam, which with colorless transparent layers is hardly visible.

After the welding, the strip may be left in place to stiffen the seam, or for other reasons. For instance, if the seam be formed to close the mouth of a bag, the strip may be used as a surface on which may be written, printed or stamped data as to the contents of the bag, the date of filling the bag, the name of the manufacturer or packager, or other data. This may be done before or after the strip is applied to serve as a label.

The adhesive used in securing the strip in place may be of a self-stick or pressure-sensitive type, so that the strip may be peeled off after the sealing and reused; and it may be of various other types; but it is essential that it have effective stickiness at room temperature and below that at which the sealing is effected. It may be of the delayed action type which is not tacky or sticky at room temperature, but becomes so when heated to a temperature below that at which the sheets soften to effect the sealing together of superposed layers. In this case, the heat in being applied to the strip and superposed layers of shrinkable material, acts first to render the adhesive tacky, so that the strip will firmly adhere to the adjacent layer and prevent the latter from shrinking; and then acts to render the layers tacky so that they will weld together under the pressure applied, and while held against shrinking by the strip and the pressure. I have referred to the use of a strip, but obviously and preferably two such strips may be used, and on opposite surfaces of the two juxtaposed layers. In any event the heat is applied through the strip or strips.

The use of delayed action thermoplastic coated strips is desirable where the strip or strips are to be removed shortly after the sealing. Such strips made by Nashua Gummed & Coated Paper Co. become tacky at a temperature in the general range of 165° F. to 180° F., which is below the sealing temperature of Saran, and retain tackiness at said sealing temperature and when cooled below. Thus it may be readily peeled off while hot, but below the temperature at which the sealing has been effected. It does not reach its permanent set after being activated and for a considerable time, even at room temperature. The strip can be removed weeks or even months later by reheating to about 180° F. to reactivate the adhesive and permit removal without affecting the seal between the layers.

Masking tapes and other similar pressure-sensitive tapes, the adhesive surface of which does not become permanently set, may be employed in carrying out my invention.

In the accompanying drawings I have illustrated only a few of many ways in which the invetnion may be utilized. In these drawings:

Fig. 1 is a perspective view of a filled and sealed bag embodying the present invention.

Fig. 2 is a vertical section through the mouth portion of the sealed bag, taken on the line 2—2 of Fig. 1.

Fig. 3 is a transverse section showing the utilization of the invention with the simultaneous closing and sealing of two bags.

Fig. 4 is a perspective view showing an apparatus for heating and sealing, and a folded strip at the mouth of the bag.

Fig. 5 is a transverse section through the mouth portion of a bag of the type having infolded side walls.

Fig. 6 is a section showing means for progressively sealing a bag and removing the protecting strips.

Fig. 7 is a perspective view of portions of a sealed bag, and in which the strip extends above the mouth of the bag and may serve as a label.

Fig. 8 is a section showing the use of the invention in forming the bottom of a bag.

Fig. 9 is a section showing the utilization of the invention for the sealing together of overlapped edges of two sheets.

Fig. 10 is a perspective view showing the partial removal of the strip applied as in Fig. 9, and Fig. 11 is a sectional view showing the utilization of the invention for the making of a tube from a sheet.

In all of the constructions illustrated the bag walls or other sheets may be of any of the various types of heat-sealable and heat-shrinkable material above referred to, and the strips used in effecting the sealing may be of paper or any other suitable non-shrinkable and non-meltable material.

In Fig. 1 I have shown a bag of the pillowcase type having a tubular body portion 10 formed of a thin heat-shrinkable and heat-sealable material, with the ends of the tube flattened to form a pair of superposed layers 11, and disposed between a pair of strips or tapes 12 which may be of paper or other non-shrinkable and non-meltable material. Although in this form two of the strips 12 are employed, it is not ordinarily necessary to use more than one such strip. Upon closing of the mouth of the bag and the later or prior application of one or two such strips, pressure is applied to flatten the mouth portion of the bag and bring the opposite walls close together. This pressure may be effected by a pair of members 13 and 14, as shown in Fig. 2, at least one of which, for instance 13, may have an electric resistance coil or may be otherwise formed so as to serve as a heater. The heat transmitted through one or both strips 12 acts to soften the sheet material forming the wall of the bag, and to such an extent that the two layers become autogenously welded or fused together.

The strips 12 are coated with an adhesive 15 which is tacky at a temperature below that at which the walls 11 soften and remains tacky at said tempreature, and therefore the walls are held firmly to the strips during the heating, so that even when they soften to the fusing or melting point they cannot shrink laterally. The adhesive may also be of a type which remains tacky at room temperature, so that after the final sealing of the bag and the release of the latter from between the pressure elements 13 and 14, the strips may be peeled off.

In Fig. 3 I have illustrated my improved method in the simultaneous closing and sealing of two bags, and by the use of a single strip 12a. After the sealing this strip may be peeled off, or it may be left in place and slitted lengthwise to separate the two bags. In this form only the pressure element may serve as a heater, and the other pressure element 14 serves merely as a base or platform against which the pressure is applied.

In Fig. 4 I have shown a modified form in which a single tape 12b coated with the type of adhesive above referred to is folded over the end of the closed bag mouth or the bottom of a collapsed tube. I have also shown a portable type of sealing means which includes two heated pressure members 13b and 14b hinged together so that they may be moved toward each other to hold the tape or strip firmly against the shrinkable bag walls during the heating and sealing.

The strips may serve as connecting means between successive bags so as to form a chain, and the strips may be adhesively secured to portions only of the mouths of the several bags, and with the strips accordion pleated so that upon pulling the strips endwise the bags will be opened to facilitate filling. After filling, the strips may be cut in two midway at the inner portion of each accordion pleat and the bag mouths closed by the application of heat and pressure through the strips against the bag walls at the mouth.

In Figs. 5 and 6 I have shown the invention as applied to bags of the type in which opposite walls 16 are infolded to form pleats 17 when the bag is collapsed. In this case the two tapes 12c are secured to opposite walls, and may be sealed thereto by means of the layers 15 of adhesive, and by the application of heat and pressure. The walls of the bag are preferably of thermoplastic material so that the bag is completely closed between the pleats and the pleats autogenously welded together.

In a construction of this type the adhesive may remain tacky after the sealing of the bag, so that the tape may be peeled off after the bags have been sealed. The operation may be a continuous one in which the bags and tape are fed between the heating rollers 13c and 14c, and the tapes then fed around rollers 20, so that as the sealed bag passes between these rollers the tapes are pulled off. To facilitate the rapid cooling of the bags so as to reduce the liability of the bags opening up when the tabs are pulled off, cooling means may be provided. This is shown as nozzles 21 for directing blasts of air against the tapes between the rollers 13c, 14c, and the rollers 20. To prevent the blast of air from passing to the point of heating, guards or partition plates 22 may be provided.

In Fig. 7 a type of construction embodying the present invention is illustrated, and in which the strip 12d is of considerable width, and only partially overlaps the sealing area. This may be preprinted or later written upon to form a label which is left permanently attached to the bag. If desired, this strip may be folded over the mouth of the bag and sealed to both sides, as shown in Fig. 4.

The invention may be employed in connection with the sealing of one end of a tube to form the bottom, as shown at the lower end of Fig. 1. In Fig. 8 there is shown the lower end of a bag 10e with the walls folded over and sealed together between tapes or strips 12e which may, if desired, extend above the edge of the folded portion and be also sealed to the lower portion of the side walls. As in the embodiments previously described, these tapes may be pulled off after the closing of the bottom of the bag, if desired.

In Fig. 9 I have illustrated the application of the invention to the sealing of the overlapped edge portions of two sheets 11a and 11b by means of a strip 12, the adhesive 15, and the heating and pressure-applying elements 13 and 14. After the sealing the strip 12 may be peeled off, as indicated in Fig. 10.

As another embodiment of the invention the opposite edge walls of a sheet 11c may be overlapped and sealed together by means of the tape and adhesive so as to form a tube, as shown in Fig. 11.

In many of my prior copending applications I have illustrated, but not claimed, various different embodiments of the present invention. This application is therefore a continuation-in-part of the following prior applications:

Ser. No. 30,647, filed June 2, 1948 for Method of and Article for Packaging Materials.
Ser. No. 38,477, filed July 13, 1948 for Bag Assemblies.
Ser. No. 41,497, filed July 30, 1948 for Bag Filling Machines.
Ser. No. 46,057, filed August 25, 1948 for Bag Assemblies and Apparatus for Filling Bags.
Ser. No. 50,867, filed September 23, 1948 for Chained Bags with Sealing Attachment.
Ser. No. 51,946, filed September 30, 1948 for Bag Assemblies.

It will of course be understood that in the various figures of the drawings the various layers whether in the form of bag walls, strips or adhesive, are illustrated of very greatly magnified thickness to facilitate illustration, and that the bag walls would ordinarily be very thin, and in the form of what is commonly referred to in the trade as 'films.'

Having thus described my invention, what I claim as new and desire to secure by Letters Patent is:

In combination, superposed layers of thermoplastic material which tends to shrink or wrinkle when heated to a temperature at which said layers soften and autogenously unite, and a strip of non-shrinkable sheet material having a coating which is susceptible of tackiness at room temperature and at the temperature of softening of said layers, said strip having an edge portion secured to one of said layers and acting to prevent shrinking or wrinkling of said layers during heating and autogenous uniting of said layers, and having the opposite edge portion foldable around the edges of said layers whereby it may be adhesively secured to the outer surface of the other layer.

CLARENCE W. VOGT.

REFERENCES CITED

The following references are of record in the file of this patent:

UNITED STATES PATENTS

| Number | Name | Date |
|---|---|---|
| 2,060,906 | Snyder | Nov. 17, 1936 |
| 2,441,940 | Rohdin | May 18, 1948 |
| 2,478,121 | Morner | Aug. 2, 1949 |